United States Patent [19]

Darnell et al.

[11] Patent Number: 4,839,459

[45] Date of Patent: Jun. 13, 1989

[54] PROCESS FOR THE PREPARATION OF POLY(ETHER-KETONE) POLYMERS

[75] Inventors: W. Ronald Darnell, Weber City, Va.; Winston J. Jackson, Jr., Kingsport, Tenn.

[73] Assignee: Eastman Kodak Company, Rochester, N.Y.

[21] Appl. No.: 211,733

[22] Filed: Jun. 27, 1988

[51] Int. Cl.$^4$ ............................................. C08G 65/00
[52] U.S. Cl. ...................... 528/220; 528/223; 528/271; 528/272; 528/286; 528/296; 528/302; 528/308; 528/308.6; 528/360; 528/361; 528/364
[58] Field of Search ............ 528/220, 223, 271, 272, 528/286, 296, 302, 308, 308.6, 360, 361, 364

[56] References Cited

U.S. PATENT DOCUMENTS

| | | | |
|---|---|---|---|
| T103,703 | 12/1983 | Colquhoun et al. | 528/125 |
| 4,396,755 | 8/1983 | Rose | 528/126 |
| 4,398,020 | 8/1983 | Rose | 528/207 |
| 4,578,427 | 3/1986 | Saito et al. | 525/150 |
| 4,678,709 | 7/1987 | Tondre et al. | 428/380 |
| 4,703,102 | 10/1987 | Fukuoka et al. | 528/125 |
| 4,720,537 | 1/1988 | Brugel | 528/125 |
| 4,731,429 | 3/1988 | McMaster et al. | 528/127 |

FOREIGN PATENT DOCUMENTS 2099006 12/1982 United Kingdom .
2116990 10/1983 United Kingdom .

*Primary Examiner*—John Kight
*Assistant Examiner*—S. A. Acquah
*Attorney, Agent, or Firm*—J. Frederick Thomsen; William P. Heath, Jr.

[57] ABSTRACT

Disclosed is an improved process for the preparation of poly(ether-ketone) polymers by the reaction of at least one dicarboxylic acid with certain bis(phenoxybenzoyl) compounds in the presence of a perfluoroalkylsulfonic acid and (1) an oxide of phosphorus and/or (2) a perhaloalkanoic anhydride.

11 Claims, No Drawings

PROCESS FOR THE PREPARATION OF POLY(ETHER-KETONE) POLYMERS

TECHNICAL FIELD

This invention relates to a novel process for the preparation of polymeric poly(ether-ketones), and more specifically, to a process for preparing high molecular weight poly(ether-ketone) polymers from at least one dicarboxylic acid and certain bis(4-phenoxybenzoyl) compounds in the presence of a perfluoroalkanesulfonic acid and an oxide of phosphorus and/or a perhaloalkanoic anhydride. The polyketone polymers produced according to this invention are useful as molding plastics, coatings, films, fibers, matrix resins, etc.

BACKGROUND OF THE INVENTION

British Pat. No. 2,116,990 (also U.S. Defensive Publication T103,703) to ICI and H. M. Colquhoun, *Polymer Preprints*, 25 (2), 17–18 (1984), disclose a process for the preparation of poly(ether-ketones) (a) from dicarboxylic acids and aromatic compounds, (b) from monocarboxylic acids or (c) from a mixture of (a) and (b). The process disclosed in these references (1) does not utilize an oxide of phosphorus and/or a perhaloalkanoic anhydride in any way, (2) is limited to special 'activated' dicarboxylic acids, monocarboxylic acids, and aromatic compounds, and (3) does not include such common dicarboxylic acids as terephthalic and isophthalic acids and such aromatic compounds as diphenyl ether or biphenyl (see page 2, lines 55–67, of the British patent). In Example 6 of the British patent, an attempt is made to prepare a poly(ether-ketone) by reacting terephthalic acid and p-diphenoxybenzene in only trifluoromethanesulfonic acid at ambient temperature for 48 hours. No increase in solution viscosity was observed. Subsequently, the mixture was heated to 90° C. for 5 hours with only a slight increase in solution viscosity apparent. The Colquhoun reference paper states, in Column 2 of page 17, that "Terephthalic acid, for example, fails to react at all with aryl ethers in $CF_3SO_3H$, . . . . "

U.S. Pat. No. 4,396,755 discloses a process which involves the polymerization of (a) a dicarboxylic acid(s) with an aromatic compound(s), (b) a self-polymerizable aromatic monocarboxylic acid, or (c) a mixture of (a) and (b) in the presence of a fluoroalkanesulfonic acid and a quinquevalent phosphorus halide, such as $PCl_5$. According to Column 2, lines 20–21, "Presumably, the reaction proceeds via the in-situ formation of mono- or diacyl halide." (Di)carboxylic acid halide(s) are well known intermediates for the preparation of polyketones (see U.S. Pat. No. 4,398,020).

British Pat. No. 2,099,006 discloses a process for the preparation in trifluoromethanesulfonic acid of poly(ether-ketones) from monocarboxylic acid chlorides (such as 4-phenoxybenzoyl chloride) in which $P_2O_5$ and water may, if desired, be added to the polymerization reactor in order to produce phosphoric acid (to act as a solvent) (see lines 27–41 on page 1 and lines 1–8 and 17–20 on page 2). In this case, however, only the acid chlorides, which are appreciably more reactive than the carboxylic acids, are disclosed. The use of monocarboxylic or dicarboxylic acids is not disclosed.

European Patent Application No. 75,390 discloses the acylation of aromatic compounds to produce "arylophenones" by the reaction of an aromatic carboxylic acid with an aromatic compound in the presence of a fluoroalkanesulfonic acid. This reference does not disclose either the preparation of high molecular weight poly(ether-ketones) or the use of a phosphorus compound and/or a perhaloalkanoic anhydride in combination with a perfluoroalkanesulfonic acid.

European Patent Application No. 241,306 discloses the synthesis of polyaryletherketone by Friedel-Crafts chemistry using a catalytic quantity of a strong acid, such as trifluoromethanesulfonic acid, in a solvent of lower acidity preferably comprising a second acid of strength at least equal to chloroacetic acid. This reference neither discloses nor contemplates the preparation of poly(ether-ketones) from dicarboxylic acids and the bis(4-phenoxybenzoyl)hydrocarbons described hereinbelow. The reference also fails to disclose the preparation of a poly(ether-ketone) from dicarboxylic acids in which the reaction solvent is a perfluoroalkanesulfonic acid containing a phosphorus and/or perhaloalkanoic anhydride.

DISCLOSURE OF THE INVENTION

According to the process provided by our invention, high molecular weight poly(ether-ketones) are prepared by reacting one or more dicarboxylic acids with a bis(4-phenoxybenzoyl)hydrocarbon in the presence of a perfluoroalkylsulfonic acid(s) and (1) an oxide of phosphorus and/or (2) a perhaloalkanoic anhydride.

The polymerization occurs as HOH is formed by the elimination of an OH group from a carboxylic acid and an H from hydrogen attached to an aromatic ring, the polymer chain becoming linked together between a carbonyl group and an aromatic ring.

The aromatic dicarboxylic acids which are useful in the process of the invention may contain 8 to 30 carbon atoms and include all of those disclosed in British Pat. No. 2,116,990 incorporated herein by reference. Additionally, other aromatic dicarboxylic acids which are not disclosed in British Pat. No. 2,116,990 are also useful in the process of the invention. Such dicarboxylic acids include those having the general formula HOOC—Ar$^1$—COOH, where —Ar$^1$— is phenylene, naphthylene, or biphenylene and each —COOH is an aromatically bound carboxyl group separated from the other —COOH group by at least 3 carbon atoms. Although the arylene residues represented by —Ar$^1$— preferably are unsubstituted, they may be substituted with alkyl or alkoxy or with Cl or Br atoms. Examples of dicarboxylic acids which can be used include terephthalic acid, chloroterephthalic acid, 5-methylisophthalic acid, isophthalic acid, 4,4'-oxydibenzoic acid, 3,4'-, 3,3'-, and 4,4'-biphenyldicarboxylic acids, and 1,3-, 1,4-, 1,5-, 1,6-, 1,7-, 2,5-, 2,6-, and 2,7-naphthalenedicarboxylic acids.

Aliphatic and cycloaliphatic dicarboxylic acids containing 6 to 20 carbon atoms are also useful in the process of the invention, but aromatic dicarboxylic acids are preferred because more oxidatively and thermally stable polyketones are obtained with the aromatic acids. For aliphatic dicarboxylic acids, the carboxyl groups should be separated from each other by at least 4 carbon atoms. For cycloaliphatic dicarboxylic acids, the carboxyl groups should be attached directly to the cyclic ring and should be separated from each other by at least 3 carbon atoms. These aliphatic and cycloaliphatic dicarboxylic acids include adipic acid, azelaic acid, sebacic acid, 1,3-cyclohexanedicarboxylic acid (cis and/or trans isomers), and 1,4-cyclohexanedicarboxylic acid (cis and/or trans isomers).

The bis(4-phenoxybenzoyl)hydrocarbon reactants which may be employed in our novel process include those disclosed in European Patent Application No. 192,260 and may be represented by the formula

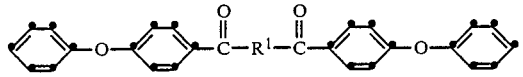

wherein $R^1$ is a divalent hydrocarbon residue such as an alkylene, cycloalkylene or arylene radical having 4 to 18 carbon atoms. The alkylene radicals preferably contain 4 to about 8 carbon atoms such as 1,4-butanediyl, 1,6-hexanediyl, 1,7-heptanediyl, 1,8-octanediyl, etc. The cycloalkylene radical preferably is 1,3- or 1,4-cyclohexylene (cis and/or trans isomers). The divalent hydrocarbon residue most preferably is an arylene radical —$Ar^1$— wherein $Ar^1$ is defined hereinabove. The bis(4-phenoxybenzoyl)hydrocarbon reactants most preferred are 1,3- and 1,4-bis(4-phenoxybenzoyl)benzene. The bis(4-phenoxybenzoyl)hydrocarbon reactants may be prepared according to known procedures. For example, two moles of diphenyl ether can be reacted with one mole of a dicarboxylic acid using a conventional Friedel-Crafts acylation catalyst.

If desired, additional types of reactants such as an aromatic compound can be included in the novel process described hereinabove. The aromatic compounds which may be used in the process may contain 10 to 30 carbon atoms and include those disclosed in British Pat. No. 2,116,990 and U.S. Pat. No. 4,611,033, also incorporated herein by reference, plus other compounds having the general formulae H—$Ar^1$—X—$Ar^1$—H or H—$R^2$—H, where $Ar^1$ is defined above, H is an aromatically bound hydrogen atom and —$R^2$— is the divalent residue of a polynuclear hydrocarbon containing at least 10 carbon atoms, and —X— is a direct bond, —O—, or —S—. Examples of such aromatic compounds include diphenyl ether, diphenyl sulfide, biphenyl, naphthalene, anthracene, and phenanthrene.

The process of the invention is carried out in a perfluoroalkylsulfonic acid(s) containing from 1-4 carbon atoms in an amount sufficient to act as a process solvent for the reactants and the poly(ether-ketone) product. The amount of perfluoroalkanesulfonic acid normally should be at least three times the theoretical weight of poly(ether-ketone) product. The upper limit of the amount of perfluoroalkanesulfonic acid is not important to the operation of the process and is determined only by the practicality of recovering the expensive acid for recycle. Trifluoromethanesulfonic acid is preferred because of its commercial availability. The perfluoroalkylsulfonic acid is preferably essentially anhydrous, but small amounts of water can be tolerated. The process provided by our invention preferably is performed in the presence of trifluoromethanesulfonic acid in an amount which is about four to nine times the theoretical weight of the poly(ether-ketone) product obtainable from the process.

The oxides of phosphorus which may be used in the process of the invention include all of those compounds which contain at least one —P—O—P— unit, such as phosphorus oxides and polyphosphoric acid. The phosphorus oxides include phosphorus trioxide and phosphorus pentoxide. Phosphorus pentoxide ($P_2O_5$ or $P_4O_{10}$) is the preferred oxide of phosphorus. Polyphosphoric acid is known to be a mixture of compounds having the structure

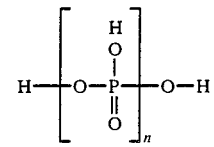

in which "n" is equal to or greater than 2. Examples of polyphosphoric acids include pyrophosphoric acid (n=2), tripolyphosphoric acid (n=3), tetrapolyphosphoric acid (n=4), etc. Cyclic structures are possible in the polyphosphoric acid structure. The polyphosphoric acid may be prepared from orthophosphoric acid and phosphorus pentoxide by well known procedures or it may be obtained commercially.

The perhaloalkanoic anhydrides which may be used, either alone or in combination with one or more of the oxides of phosphorus described hereinabove, can contain up to about 8 carbon atoms. The perhaloalkanoic anhydrides preferably are perchloro- or perfluoroalkanoic anhydrides, especially perchloroacetic and perfluoroacetic anhydrides, because of their availability. The perhaloalkanoic anhydrides may be employed in our novel process at temperatures in the range of 0° to 100° C. or higher depending on the boiling point of the particular anhydride and apparatus used and the reactivity of the anhydride or by-product acid with the reactants. However, when a perhaloalkanoic anhydride is used, the process normally will be conducted at a temperature in the range of about 23° to 75° C.

The amount of oxide(s) of phosphorus and/or perhaloalkanoic anhydride should be chosen so that the gram-moles of —P—O—P— unit and/or perhaloalkanoic anhydride totals at least two per gram-mole of dicarboxylic acid(s) used in the reaction. Thus, in the case of the preferred phosphorus pentoxide, at least 0.67 gram-mole ($P_2O_5$) per gram-mole of dicarboxylic acid is required since one mole of $P_2O_5$ will react with three moles of water. Similarly, when using a perhaloalkanoic anhydride without an oxide of phosphorus, at least two gram-moles of anhydride per gram-mole of dicarboxylic acid should be used. It is advantageous to utilize an excess of at least 10% of the phosphorus pentoxide and/or perhaloalkanoic anhydride to offset trace amounts of water present in the reactants and in or on the apparatus used in conducting the process. Faster rates of polymerization are achieved when more oxide of phosphorus and/or anhydride is used, but problems of varying severity with undissolved or poorly dispersed starting materials and/or problems with control of temperature and molecular weight may be encountered, depending on the poly(ether-ketone) composition. The use of a total of 7.0 gram-moles of —P—O—P— unit and/or gram-moles of perhaloalkanoic anhydride per gram-mole of dicarboxylic acid(s) being utilized in the process normally gives good results although total amounts of 14 to 16 or more gram-moles of —P—O—P— unit and/or anhydride per gram-mole of dicarboxylic acid may be used to prepare some polyketone compositions. Our process preferably is carried out in the presence of an oxide of phosphorus, most preferably without using a perhaloalkanoic anhydride.

The reaction may be carried out at 0° to 100° C., but temperatures up to 150° C. may be used with some reactants. The higher polymerization temperatures give faster polymerization rates but increase the probability of undesirable side reactions, such as fluoroalkylsulfonation of aromatic moieties, branching of the poly(ether-ketone), and/or problems of reactor temperature control because of the exothermicity of the reaction. A temperature of about 10°–40° C. is preferred. Although the process normally is conducted at atmospheric pressure, reduced pressures may be used so long as nothing volatilizes from the reaction mixture, and increased pressures up to 3000 psi or more may be used.

The time of the polymerization may vary from a few minutes to several days, depending on the structure of the starting materials, the temperature, the amount of perfluoroalkylsulfonic acid, and the amount of the oxide of phosphorus and/or perhaloalkanoic anhydride used. The optimum conditions for the preparation of the poly(ether-ketones) by the process of the invention should be determined experimentally for the desired composition in order to prepare the desired molecular weight.

The poly(ether-ketones) obtainable from the process provided by our invention contain at least 50 mole percent, preferably at least 75 mole percent, of monomer units of the formulas

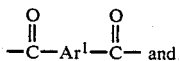  and

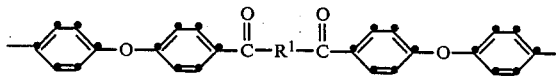

with the remainder of the polymer made up primarily or entirely of monomer units having the formulas —Ar$^1$—X—Ar$^1$— and/or —R$^2$— wherein Ar$^1$, R$^1$, R$^2$ and X are described hereinabove. The most preferred poly(ether-ketones) prepared according to the process consist essentially of the residues of an aromatic dicarboxylic acid and the above bis(4-phenoxybenzoyl)hydrocarbon, especially those wherein Ar$^1$ and R$^1$ are 1,3- or 1,4-phenylene. Very high molecular weight poly(ether-ketones), e.g. having an inherent viscosity of 2.0 or more may be prepared by the process of the invention. The preferred poly(ether-ketones) obtainable from the process of the invention have an inherent viscosity of from about 0.6 to 1.8. The especially preferred poly(ether-ketones) which can be prepared by the process of the invention have an inherent viscosity in the range of about 0.7 to 1.5. Such polymers are useful because of their excellent thermal, oxidative, and hydrolytic stability and their excellent solvent and chemical resistance.

The molecular weight of the poly(ether-ketones) prepared by the process of the invention may be controlled by adding an excess of one of the starting materials, preferably the bis(4-phenoxybenzoyl)hydrocarbon or one of the aromatic compounds described hereinabove, or by the addition of suitable end-capping species, which also may improve the thermal stability of the poly(ether-ketones) product. Benzoic acid or biphenyl may be used for this purpose. Preferably, the end-capping component is the bis(4-phenoxybenzoyl)hydrocarbon used in the polymerization. In addition to controlling the molecular weight of the poly(ether-ketones), an excess of the aromatic compound also aids in the control of polymer branching. In a preferred embodiment of the process of the invention, at least 2 mole percent excess of the bis(4-phenoxybenzoyl)hydrocarbon is used to control branching in the poly(ether-ketone).

The process of the invention may be carried out (1) by adding the perfluoroalkylsulfonic acid to the reactants and then adding the oxide(s) of phosphorus and/or perhaloalkanoic anhydride, (2) by predissolving or mixing the oxide(s) of phosphorus and/or anhydride in the perfluoroalkylsulfonic acid at ambient or somewhat elevated temperature and then adding the reactants, (3) by first adding the perfluoroalkylsulfonic acid to the polymerization vessel followed by addition of the reactants individually, or (4) by essentially simultaneous addition of all of the starting materials to the polymerization reactor. Also, the reaction may be carried out in a stepwise manner, such as by reacting the dicarboxylic acid(s) with only a portion of the bis(4-phenoxybenzoyl)hydrocarbon to prepare an oligomer which can be subsequently reacted with the remainder of the bis(4-phenoxybenzoyl)hydrocarbon, and, optionally, one of the aromatic compounds or self-polymerizable monocarboxylic acids, to form a high molecular weight polymer. Similarly, the bis(4-phenoxybenzoyl)hydrocarbon may be reacted with a portion of the dicarboxylic acid(s) followed by further reaction with the remainder of the dicarboxylic acid(s). It may be advantageous to predissolve one or more of the reactants in the perfluoroalkylsulfonic acid and then add the oxide(s) of phosphorus and/or perhaloalkanoic anhydride to effect the polymerization. Alternatively, to avoid the formation of 'lumps', it may be advantageous first to add the perfluoroalkylsulfonic acid to the polymerization vessel, begin stirring the reactor contents at a moderate rate, and then add the other polymerization ingredients. For larger batches, the perfluoroalkylsulfonic acid may be placed into the reaction vessel first and then the other materials may be added—the dicarboxylic acid, perhaloalkanoic anhydride or oxide of phosphorus being added last, in increments if necessary to control the exothermicity of the polymerization. This latter process is generally preferred.

The poly(ether-ketones) prepared by the process of the invention may be isolated by precipitation in aqueous alkali followed by extractions with boiling water or dilute sodium carbonate. The poly(ether-ketones) may be further purified by extractions with suitable solvents or by dissolution in a suitable solvent and reprecipitation in a non-solvent.

Our novel process is further illustrated by the following examples. The inherent viscosity (I.V.) specified in the examples and in the preceding description are determined at 25° C. in 98% sulfuric acid at a concentration of 0.25 g poly(ether-ketone) per 100 mL of 98% sulfuric acid. The films are pressed in a Hannifin press at 375° C. and the differential scanning calorimetry (endotherm peaks and Tg's) are obtained using a Perkin Elmer Differential Scanning Calorimeter, Model DSC-2, at a scale rate of 20° C./minute. The apparatus used consists of a 50-mL, 3-necked flask equipped with a stirrer consisting of a glass shaft and a Teflon fluoropolymer blade, a nitrogen inlet, a thermometer, an outlet port and an electric stirring motor. The flask and stirrer are dried in a forced-air oven at 130° C. for 15 minutes immediately prior to use. The flask is placed in a chilled water batch and filled with nitrogen.

EXAMPLE 1

To the cooled (20° C.) agitated flask are added in order:
Trifluoromethanesulfonic acid, 31 mL,
Isophthalic acid, 1.66 g, 0.01 mole,
1,3-Bis(4-phenoxybenzoyl)benzene, 4.76 g, 0.01 mole assuming a molecular weight of 476 due to the presence of 1.9% oligomeric material, and
Phosphorus pentoxide, 2.84 g, 0.02 mole.

A mild exotherm occurs from 18° to 22° C. when the phosphorus pentoxide is added. The cooling bath is removed and stirring is continued at about 23° C. for two hours. At this time, the polymerization mixture is very dark red-amber and the viscosity has increased to a high level. The reaction is stopped and the poly(ether-ketone) product is precipitated by slowly adding the reaction mixture to water in a Waring blender. The appearance of the poly(ether-ketone) changes immediately to a cream colored, particulate material which is purified by rinsing three times in deionized water, twice in boiling deionized water for about an hour each time, rinsing with acetone, refluxing in acetone overnight, rinsing with acetone and vacuum drying at 120° C. overnight. The poly(ether-ketone) has an I.V. of 1.54 and a film pressed from the polymer is clear, amber and very tough. The poly(ether-ketone) has a DSC endotherm at 269° C. and a Tg at 158° C.

This example demonstrates the rapid polymerization rate and the high inherent viscosity poly(ether-ketone) obtainable from the use of the process of the invention.

EXAMPLE 2

Example 1 is repeated using an equimolar amount of terephthalic acid instead of isophthtalic acid. After all of the ingredients are added, the polymerization mixture is stirred at 23° C. for five hours to obtain a high viscosity, red-amber reaction mixture. The poly(ether-ketone) product is isolated, purified and dried as described in Example 1. The I.V. of the product is 1.55, the melting endotherms are 279° C. and 303° C. and the Tg is 165° C. A film pressed of the poly(ether-ketone) is very tough, clear and amber.

EXAMPLE 3

Example 1 is repeated using an equal amount of 1,4-bis(4-phenoxybenzoyl)benzene instead of the 1,3-compound used in Example 1. After the addition of the reaction ingredients, the polymerization mixture is stirred for three hours at 23° C. The poly(ether-ketone) product is isolated, purified and dried as in Example 1. The polymer product is cream colored, has an I.V. of 2.82, DSC endotherms at 283° and 304° C. and a Tg at 165° C. and gives a clear, tough, amber film.

EXAMPLE 4

To the stirred flask are added at a temperature over the range of about 18° to 21° C. in order:
Trifluoromethanesulfonic acid, 34 mL,
2,6-Naphthalenedicarboxylic acid, 2.89 g, 0.0134 mole,
1,3-Bis(4-phenoxybenzoyl)benzene, 3.14 g, 0.0066 mole,
Biphenyl, 1.02 g, 0.0066 mole, and
Phosphorus pentoxide, 3.81 g, 0.0268 mole.

The cooling bath is removed and the polymerization mixture is stirred at 23° C. for six days after which time the viscosity has increased to a medium-high level. The poly(ether-ketone) product thus produced is isolated, purified and dried as described in Example 1. The cream colored product has an I.V. of 1.35, a Tm at 250° C. and a Tg at 195° C. and a film pressed from the product at 375° C. is clear, tough and amber.

EXAMPLE 5

To the cooled (15° C.) agitated flask are added in order:
Trifluoromethanesulfonic acid, 15 mL,
Trifluoroacetic anhydride, 12.6 g, 0.06 mole,
Isophthalic acid, 1.66 g, 0.01 mole, and
1,3-Bis(4-phenoxybenzoyl)benzene, 4.81 g, 0.0102 mole, a 2 mole percent excess assuming 1 weight percent oligomer.

The chilled water, cooling bath is then removed and the temperature is allowed to warm to about room temperature (23° C.). The reaction mixture is stirred for 25 hours at room temperature to obtain a dark red-amber, high-viscosity solution. The poly(ether-ketone) product is precipitated by the addition of water, washed three times with water, boiled in water twice for about an hour, boiled in acetone overnight and vacuum dried at 120° C. The off-white, fibrous poly(ether-ketone) has an inherent viscosity of 0.72 and gives a creaseable, clear, pressed film at 375° C.

EXAMPLE 6

Example 5 is repeated except that no chilled water cooling bath is used and the polymerization is carried out at 55° C. commencing with the completion of the addition of the materials to the flask. After only 2.5 hours at 55° C., a high-viscosity, red-amber solution is obtained which is precipitated, purified and vacuum dried as described in Example 5. The off-white poly(ether-ketone) has an I.V. of 1.55 and gives a tough, clear film pressed at 375° C.

EXAMPLE 7

Substituting trichloroacetic anhydride (18.54 g, 0.06 mole) for the trifluoroacetic anhydride, the same materials and amounts used in Example 5 are added to the flask. The contents of the flask are then heated to and maintained at 75° C. with stirring for 2.7 hours to obtain a high-viscosity, dark amber solution. The poly(ether-ketone) is precipitated, purified and vacuum dried as described in Example 5. The light-tan, fibrous product has an I.V. of 2.23 and gives a tough film pressed at 375° C.

The invention has been described in detail with particular reference to preferred embodiments thereof, but it will be understood that variations and modifications will be effected within the spirit and scope of the invention.

We claim:

1. Process for the preparation of a poly(ether-ketone) containing at least 50 mole percent of monomer segments derived from an aromatic dicarboxylic acid and a bis(4-phenoxybenzoyl)hydrocarbon, which comprises reacting at a temperature of about 0° to 150° C. until the desired degree of polymerization is achieved an aromatic dicarboxylic acid and a bis(4-phenoxybenzoyl)hydrocarbon in the presence of a perfluoroalkanesulfonic acid in an amount which is at least three times the theoretical amount of poly(ether-ketone) product and (1) an oxide of phosphorus and/or (2) a perhaloalkanoic anhydride in an amount of at least a total of two gram-moles of —P—O—P— unit and/or gram-moles of perhaloalkanoic anhydride per gram-mole of dicarboxylic acid reactant.

2. Process according to claim 1 wherein the aromatic dicarboxylic acid has the formula HOOC—Ar$^1$—COOH and the bis(4-phenoxybenzoyl)hydrocarbon has the formula

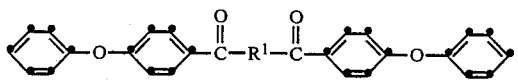

wherein Ar$^1$ is phenylene, naphthylene or biphenylene and each —COOH is an aromatically bound carboxyl separated from the other —COOH group by at least three carbon atoms and R$^1$ is alkylene or cycloalkylene having 4 to 18 carbon atoms or Ar$^1$.

3. Process according to claim 2 wherein the poly(ether-ketone) product has an inherent viscosity of about 0.6 to 1.8 and the process is performed at a temperature of about 10° to 40° C.

4. Process for the preparation of a poly(ether-ketone) containing at least 75 mole percent of monomer segments derived from one or more aromatic dicarboxylic acids and a bis(4-phenoxybenzoyl)hydrocarbon, which comprises reacting at a temperature of about 10° to 40° C. until a poly(ether-ketone) having an inherent viscosity of about 0.7 to 1.5 is obtained one or more dicarboxylic acids having the formula HOOC—Ar$^1$—COOH with a bis(4-phenoxybenzoyl)hydrocarbon having the formula

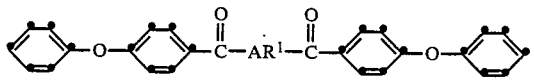

in the presence of trifluoromethanesulfonic acid in an amount which is about four to nine times the theoretical weight of the poly(ether-ketone) product and an oxide of phosphorus in an amount of at least two gram-mole of —P—O—P— per gram-mole of dicarboxylic acid reactant; wherein Ar$^1$ is phenylene, naphthylene or biphenylene and each —COOH is an aromatically bound carboxyl separated from the other —COOH by at least three carbon atoms.

5. Process according to claim 4 wherein the poly(ether-ketone) optionally contains monomer segments derived from an aromatic compound having the formula H—Ar$^1$—X—Ar$^1$—H or H—R$^2$—H wherein Ar$^1$ is defined in claim 4, H is an aromatically bound hydrogen atom and R$_2$ is the divalent residue of a polynuclear hydrocarbon containing at least 10 carbon atoms.

6. Process for the preparation of a poly(ether-ketone) containing at least 75 mole percent of monomer segments derived from an aromatic dicarboxylic acid selected from isophthalic, terephthalic and 2,6-naphthalenedicarboxylic acids and a bis(4-phenoxybenzoyl)hydrocarbon selected from 1,3- and 1,4-bis(4-phenoxybenzoyl)benzene which comprises reacting at a temperature of about 10° to 40° C. until a poly(ether-ketone) having an inherent viscosity of about 0.7 to 1.5 is obtained, an aromatic dicarboxylic acid selected from isophthalic, terephthalic and 2,6-naphthalenedicarboxylic acids and 1,3- or 1,4-bis(4-phenoxybenzoyl)benzene in the presence of trifluoromethanesulfonic acid in an amount which is about four to nine times the theoretical weight of the poly(ether-ketone) product and an oxide of phosphorus in an amount of at least one gram-mole of —P—O—P— unit per gram-mole of carboxyl group of the reactant.

7. Process according to claim 6 wherein the poly(ether-ketone) contains monomer segemts derived from biphenyl or diphenyl ether.

8. Process for the preparation of a poly(ether-ketone) containing at least 75 mole percent of monomer segments derived from one or more aromatic dicarboxylic acids and a bis(4-phenoxybenzoyl)hydrocarbon, which comprises reacting at a temperature of about 10° to 40° C. until a poly(ether-ketone) having an inherent viscosity of about 0.7 to 1.5 is obtained one or more dicarboxylic acids having the formula HOOC—Ar$^1$—COOH with a bis(4-phenoxybenzoyl)hydrocarbon having the formula

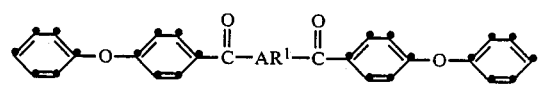

in the presence of trifluoromethanesulfonic acid in an amount which is about four to nine times the theoretical amount of poly(ether-ketone) product and perfluoroacetic or perchloroacetic anhydride in an amount of at least two gram-moles of anhydride per gram-mole of dicarboxylic acid reactant; wherein Ar$^1$ is phenylene, naphthylene or biphenylene and each —COOH is an aromatically bound carboxyl separated from the other —COOH by at least three carbon atoms.

9. Process according to claim 8 wherein the poly(ether-ketone) optionally contains monomer segments derived from an aromatic compound having the formula H—Ar$^1$—X—Ar$^1$—H or H—R$^2$—H wherein Ar$^1$ is defined in claim 4, H is an aromatically bound hydrogen atom and R$^2$ is the divalent residue of a polynuclear hydrocarbon containing at least 10 carbon atoms.

10. Process for the preparation of a poly(ether-ketone) containing at least 75 mole percent of monomer segments derived from an aromatic dicarboxylic acid selected from isophthalic, terephthalic and 2,6-naphthalenedicarboxylic acids and a bis(4-phenoxybenzoyl)hydrocarbon selected from 1,3- and 1,4-bis(4-phenoxybenzoyl)benzene which comprises reacting at a temperature of about 10° to 40° C. until a poly(ether-ketone) having an inherent viscosity of about 0.7 to 1.5 is obtained, an aromatic dicarboxylic acid selected from isophthalic, terephthalic and 2,6-naphthalenedicarboxylic acids and 1,3- or 1,4-bis(4-phenoxybenzoyl)benzene in the presence of trifluoromethanesulfonic acid in an amount which is about four to nine times the theoretical amount of poly(ether-ketone) product and perfluoroacetic or perchloroacetic anhydride in an amount of at least two gram-mole of anhydride per gram-mole of dicarboxylic acid reactant.

11. Process according to claim 10 wherein the poly(ether-ketone) contains monomers segemts derived from biphenyl or diphenyl ether.

* * * * *